United States Patent
Stratton et al.

(10) Patent No.: US 9,518,741 B2
(45) Date of Patent: Dec. 13, 2016

(54) FUEL CONTROL MODULE GAS VENT MANIFOLD

(71) Applicant: SOLAR TURBINES INCORPORATED, San Diego, CA (US)

(72) Inventors: Darren Matthew Stratton, San Diego, CA (US); Behnood Miri, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 635 days.

(21) Appl. No.: 13/972,449

(22) Filed: Aug. 21, 2013

(65) Prior Publication Data

US 2015/0052909 A1     Feb. 26, 2015

(51) Int. Cl.
  F23R 3/28    (2006.01)
  F23K 5/00    (2006.01)
  F23N 1/00    (2006.01)
  F02C 7/22    (2006.01)

(52) U.S. Cl.
  CPC ............. *F23R 3/28* (2013.01); *F23K 5/007* (2013.01); *F23N 1/002* (2013.01); *F02C 7/222* (2013.01); *F23K 2401/201* (2013.01); *F23N 2041/20* (2013.01)

(58) Field of Classification Search
  CPC .............. F02C 7/22; F02C 7/232; F02C 7/222
  See application file for complete search history.

(56) References Cited

U.S. PATENT DOCUMENTS

| | | | | |
|---|---|---|---|---|
| 5,316,261 A * | 5/1994 | Stoner | ........................ | G01F 1/40 |
| | | | | 138/45 |
| 6,487,860 B2 * | 12/2002 | Mayersky | ................ | F02C 7/222 |
| | | | | 285/386 |
| 6,513,317 B2 * | 2/2003 | Arar | ........................ | F02C 3/28 |
| | | | | 60/39.12 |
| 7,036,302 B2 * | 5/2006 | Myers, Jr. | ............... | F23R 3/343 |
| | | | | 60/39.281 |
| 9,140,453 B2 * | 9/2015 | Kojovic | ..................... | F23R 3/20 |
| 2008/0092545 A1 * | 4/2008 | Fish | ........................ | F02C 7/222 |
| | | | | 60/739 |
| 2010/0162726 A1 | 7/2010 | Robertson et al. | | |
| 2011/0162375 A1 * | 7/2011 | Berry | ........................ | F23R 3/60 |
| | | | | 60/746 |
| 2012/0048000 A1 * | 3/2012 | Kirzhner | ................... | F02C 7/22 |
| | | | | 73/40.5 R |

OTHER PUBLICATIONS

Pipe Flow Calculations, www.clarkson.edu, retrieved Mar. 17, 2015.*

* cited by examiner

*Primary Examiner* — Gerald L Sung
*Assistant Examiner* — Stefan Ibroni
(74) *Attorney, Agent, or Firm* — Procopio, Cary, Hargreaves & Savitch LLP (57) ABSTRACT

A fuel control module including a gas vent manifold is disclosed. The gas vent manifold includes a first gas vent portion including a first gas vent connection and a second gas vent portion including a second gas vent connection. The gas vent manifold also includes a condensation portion extending between the first gas vent portion and the second gas vent portion. The gas vent manifold further includes a condensation drain port fluidly connected to the condensation portion. The gas vent manifold also includes a plurality of connection ports. Each connection port is configured to fluidly couple the gas vent manifold to a vent line of one or more pneumatic valves.

20 Claims, 3 Drawing Sheets

FUEL CONTROL MODULE GAS VENT MANIFOLD

TECHNICAL FIELD

The present disclosure generally pertains to gas turbine engines, and is more particularly directed toward a gas vent manifold for a fuel control module of a gas turbine engine.

BACKGROUND

Gas turbine engine packages typically include certain support systems, such as a fuel control module, that are installed on or within an enclosure on a support platform, keeping systems necessary to the turbine's operation together and in proximity. Each facility housing a gas turbine engine package may be set up differently and may need to connect to the gas turbine engine package from a different location to supply/remove fuel, gas, air, and other resources to/from the gas turbine engine package.

U.S. Pat. App. Pub. No. 2010/0162726 Robertson et al. published on Jul. 1, 2010 shows a mobile platform system for a gas turbine engine. In particular, the disclosure of Robertson et al. is directed toward a system for moving an auxiliary component of a gas turbine engine. The system may have a mobile support platform configured to support the auxiliary component during operation of the gas turbine engine. The system may further have at least one guide assembly operably connected to the mobile support platform and configured to guide movement of the mobile support platform. The system may also have a drive assembly operably connected to the mobile support platform and configured to impart movement of the mobile support platform between an elevated position and a lowered position.

The present disclosure is directed toward overcoming one or more of the problems discovered by the inventors or that is known in the art.

SUMMARY OF THE DISCLOSURE

A fuel control module for a gas turbine engine is disclosed. The fuel control module includes a first side and a second side. The fuel control module also includes a first outer end extending from the first side to the second side, and a second outer end extending from the first side to the second side, opposite the first outer end. The fuel control module further includes a fuel path including a fuel inlet configured to receive fuel from a fuel supply, and a fuel outlet configured to deliver fuel to the gas turbine engine. The fuel control module also includes a plurality of pneumatic valves.

The fuel control module further includes a gas vent manifold. The gas vent manifold includes a first gas vent portion, a second gas vent portion, a condensation portion, a condensation drain port, and a plurality of connection ports. The first gas vent portion includes a first gas vent connection adjacent the first side. The second gas vent portion is distal to the first gas vent portion and is in fluid communication with the first gas vent portion. The second gas vent portion includes a second gas vent connection adjacent the second side. The condensation portion extends between the first gas vent portion and the second gas vent portion. The axis of the condensation portion extends on a different plane than a plane including the axis of the first gas vent portion and the axis of the second gas vent portion. The condensation portion connects to the first gas vent portion distal to the first gas vent connection and connects to the second gas vent portion distal to the second gas vent connection. The condensation drain port is in fluid communication with the condensation portion. Each connection port is in fluid communication with one of the first gas vent portion, the second gas vent portion, and the condensation portion and to a vent line of at least one of the plurality of pneumatic valves.

DETAILED DESCRIPTION

The systems disclosed herein include a gas turbine engine package including a fuel control module that includes a gas vent manifold. In embodiments, the gas vent manifold includes a condensation portion, a first gas vent portion proximal one side of the single frame unit, and a second gas vent portion proximal the opposite side of the single frame unit. The condensation portion includes a first condensation drain port located closer to one side of the single frame unit and a second condensation drain port located closer to the opposite side of the single frame unit. The first gas vent portion includes a first gas vent connection and the second gas vent portion includes a second gas vent connection. The condensation ports and the gas vent connections located on each side of the fuel control module may allow for universal installation of the fuel control module and may facilitate gas vent and condensation connections on either side of the fuel control module.

Figure 1:
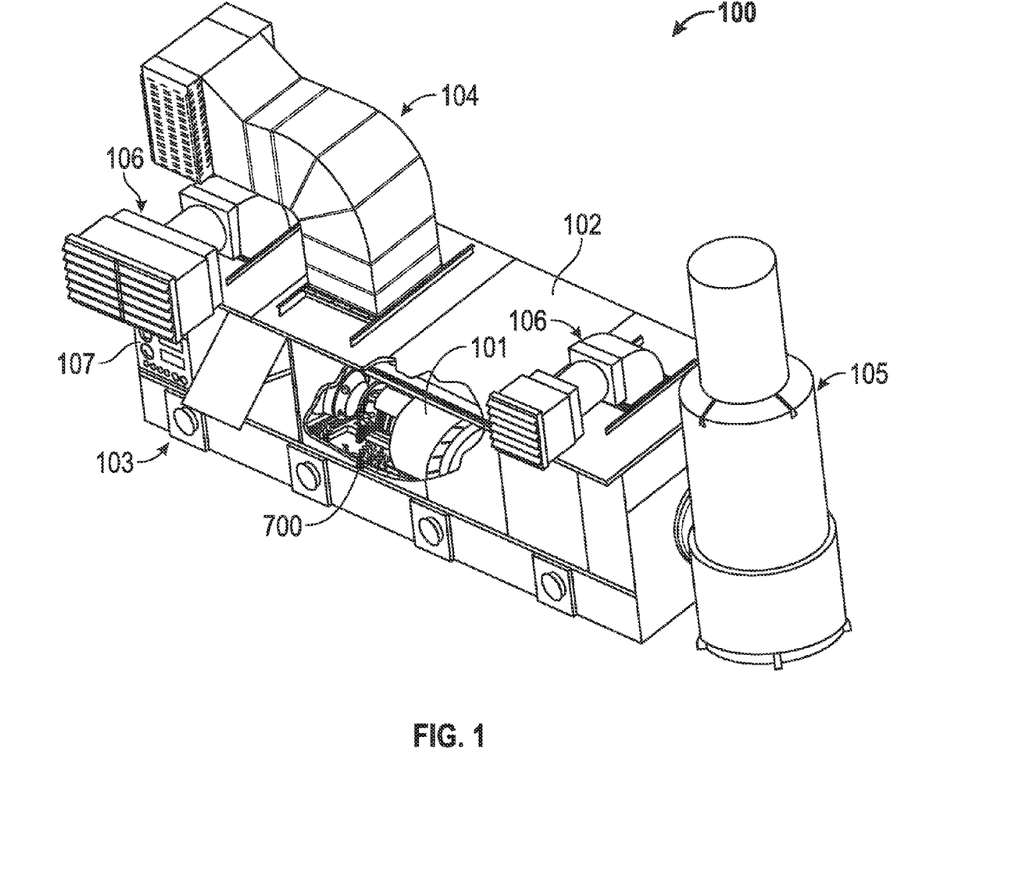
FIG. 1 is a cutaway perspective view of a gas turbine engine package.

FIG. 1 is a cutaway perspective view of a gas turbine engine package 100. Some of the surfaces have been left out or exaggerated (here and in other figures) for clarity and ease of explanation. In FIG. 1, some of the enclosure 102 has been cut away to show some the interior components.

The gas turbine engine package 100 may include a gas turbine engine 101, an enclosure 102, and a support platform 103. The gas turbine engine 101 may be mounted to and supported by the support platform 103. In addition, the gas turbine engine 101 may be housed in the enclosure 102. The gas turbine engine package 100 may also include one or more auxiliary features such as an inlet duct 104, an exhaust duct 105, one or more vents 106, and a control panel 107, for example.

Generally, the gas turbine engine 101 includes an inlet, a compressor, a combustor, a turbine, an exhaust, and a power output coupling. One or more of the gas turbine engine's 101 rotating components are coupled together by one or more rotating shafts.

Functionally, air enters the gas turbine engine inlet via the inlet duct 104 and is compressed by the compressor. Once compressed, the air leaves the compressor, and enters the combustor, where it is diffused and fuel is added. In particular, fuel is supplied to a plurality of fuel injectors from a fuel supply and via a fuel control module. The fuel control module 700 is located off of the gas turbine engine 101, but within the gas turbine engine package 100, and is in fluid communication with the plurality of fuel injectors. After the combustion reaction, energy is then extracted from the combusted fuel/air mixture via the turbine. Exhaust gas then exits the system via the exhaust duct 105.

Various types of gaseous and liquid fuels may be directed into the combustor through fuel injectors. The gaseous fuel may include, for example, natural gas, landfill gas, bio-gas, syngas, etc. The liquid fuels may include diesel, kerosene, gasoline, or any other type of liquid fuel. In some applications, the gas turbine engine 101 may be operated primarily using a fuel that is cheaply available at the location where the gas turbine engine 101 is operating. For example, in an oil field with an abundant supply of natural gas, the gas turbine engine 101 may operate primarily using natural gas. In such applications, liquid fuel may be reserved for engine operating conditions where a liquid fuel may be more desirable. For instance, a liquid fuel may be directed to gas turbine engine 101 during startup and when combustion instabilities are detected in the combustor. After the gas turbine engine 101 reaches a stable operating condition, the liquid fuel supply to the gas turbine engine 101 may be turned off, and the gaseous fuel supply turned on.

Figure 2:
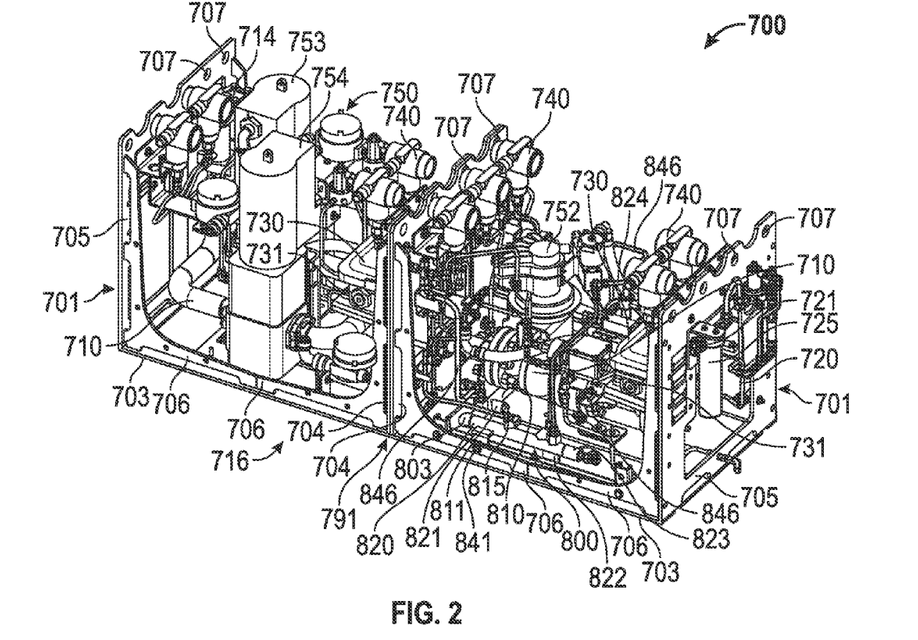
FIG. 2 is a perspective view of a first side of the exemplary fuel control module of FIG. 1.
Figure 3:
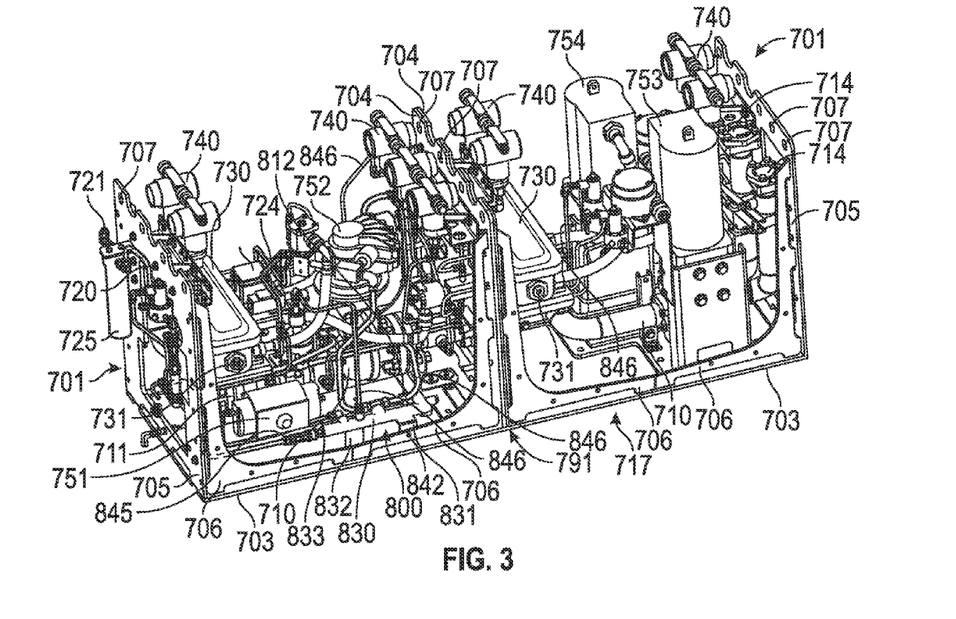
FIG. 3 is of a perspective view of a second side of the exemplary fuel control module of FIG. 2.

FIG. 2 is a perspective view of a first side 716 of the exemplary fuel control module 700 of FIG. 1. FIG. 3 is a perspective view of a second side 717 of the exemplary fuel control module 700 of FIG. 2. Referring to FIGS. 2 and 3, the fuel control module 700 is shown as a stand-alone structure having the functional components to control fuel flow to the injectors of a gas turbine engine. Some of the surfaces and plumbing have been left out or exaggerated for clarity and ease of explanation.

As illustrated, the fuel control module 700 includes a first side 716 and a second side 717. When installed in the gas turbine engine package 100, the first side 716 and the second side 717 extend in the same direction as the shaft/axis of the gas turbine engine 101.

In the embodiment illustrated and described herein, the fuel control module 700 is a split fuel control module that includes two frame units 701, a segmented fuel path 710, and a distributed fuel controller 750. In other embodiments, the fuel control module may include a single frame unit and a single fuel path. The distributed fuel controller 750 generally includes the assorted controllers and devices that interface with the segmented fuel path 710, which includes the assorted interfaces and passageways that carry and distribute fuel through the fuel control module 700.

The fuel control module 700 may further include a pressurized gas path 720, one or more terminal boxes 730, one or more transmitters 740, and other componentry. As above, the segmented fuel path 710 generally includes the assorted interfaces and passageways that carry and distribute air or gas through the fuel control module 700. According to one embodiment the fuel control module 700 may include more than two frame units 701.

Each frame unit 701 supports a portion of the segmented fuel path 710, a portion of the pressurized gas path 720, and/or a portion of the distributed fuel controller 750. According to one embodiment, the fuel control module 700 may include more than two frame units 701, each supporting a portion of the segmented fuel path 710, a portion of the pressurized gas path 720, and/or a portion of the distributed fuel controller 750.

Each frame unit 701 is joined together at a frame unit interface 791 to form the fuel control module 700. According to one embodiment, the frame unit interface 791 may be a reference plane. According to another embodiment, the frame unit interface 791 may be a reference complex surface. In addition, segments of the segmented fuel path 710 are fluidly coupled together at the frame unit interface 791.

Similarly, segments of the pressurized gas path 720 are fluidly coupled together at the frame unit interface 791.

Each frame unit 701 includes a base 703 and an inner end 704. The frame unit 701 may also include an outer end 705 located opposite the inner end 704. According to one embodiment, the inner end 704 and the outer end 705 may be joined to opposite ends of the base 703 and extend in the same direction between the first side 716 and the second side 717, and perpendicularly from the base 703, perpendicular meaning exactly perpendicular plus or minus five degrees in either direction. According to one embodiment, the base 703 may have a rectangular footprint and have a centerline running between the inner end 704 and the outer end 705. According to one embodiment, the footprint of each frame unit 701 is limited not to exceed a vertical channel where the base 703 may be freely lowered alongside the gas turbine engine 101 to the support platform 103 (FIG. 1) without lateral contact.

The structural members forming each frame unit 701 are coupled together. In particular, the inner end 704 and the outer end 705 may be joined to the base 703 using fasteners, welded together, using locking joints, and/or using any conventional joining. According to one embodiment, the base 703, the inner end 704, and the outer end 705 may be formed from a single material.

The frame unit 701 may include at least one side support 706. Each side support 706 may be joined to the base 703 and to the inner end 704 and/or the outer end 705 along either the first side 716 or the second side 717. Each side support 706 and may be configured structurally as a corner brace. In particular, each side support 706 may be configured to strengthen the frame unit 701 against loading on the joint between the base 703 and the inner end 704, and/or between the base 703 and the outer end 705.

According to one embodiment, the frame unit 701 may include four side supports 706, for example, where the base 703 is rectangular, one may be located at each corner between the base 703 and the inner end 704 and the outer end 705. Additionally, each side support 706 may couple to the base 703, and to the inner end 704 or the outer end 705, extending perpendicularly from the base 703. According to another embodiment, the frame unit 701 may include two side supports 706 extending the length of the base between the inner end 704 and the outer end 705. For example, where the base 703 is rectangular, each side support 706 may be coupled to and extend orthogonally from the first base 703, the first inner end 704, and the first outer end 705, orthogonal meaning exactly orthogonal plus or minus five degrees in any direction.

The structural members of the frame unit 701 may be made of corrosion resistant steel or any other suitable structural material. In addition, the structural members may be lightened by removing material and/or creating holes throughout the frame unit 701. According to one embodiment, material may be removed from the structural members to form functional features of the frame unit 701, as discussed further below.

The frame unit 701 includes transport features. In particular, the frame unit 701 may include a plurality of lifting devices 707 that couple with a mating transport device off of the frame unit 701, such as on a crane or other lifting machinery. For example, a lifting device 707 may include integrated features (e.g., openings, notches, hook arms, etc.) or added-on attachments (e.g., brackets, rings, hooks, etc.) that can couple with a crane attachment (e.g., hook, cable, rope, etc.) or the like. In this way, the frame unit 701 may be lifted, carried and lowered into position for assembly.

According to one embodiment, a lifting device 707 may include a section of the inner end 704 and/or a section of the outer end 705 configured to receive the crane attachment. In particular, the inner end 704 and/or the outer end 705 may include integrated features or added-on attachments. For example, as illustrated, lifting device 707 may include a plurality of openings in an upper portion of the inner end 704 and/or the outer end 705. The openings are perforations through the inner end 704 and/or the outer end 705. The plurality of openings may be round (as illustrated), or of any convenient shape. Moreover, as discussed above, plurality of openings may be oversized so as to incrementally reduce the weight of the frame unit 701, and thus make it more maneuverable.

According to one embodiment, the lifting devices 707 may include multiple lift configurations. In particular, the lifting devices 707 may incorporate balanced and/or off-balanced lift points. Moreover, the lifting devices 707 may incorporate symmetric and/or asymmetric lift points. For example, where the plurality of lifting devices 707 is made up plurality of openings in an upper portion of the inner end 704 and the outer end 705, four openings (two on the inner end 704 and two on the outer end 705) may be positioned such that, when the frame unit 701 is lifted, the base 703 is balanced and remains substantially horizontal. Alternately, the four openings may be located such that, when the frame unit 701 is lifted, the base 703 is imbalanced and tilts at a non-horizontal angle.

Moreover, the plurality of lifting devices 707 may include both embodiments combined (i.e., balanced and imbalanced), to include six or more openings such that the frame unit 701 may be hoisted with the base 703 remaining substantially horizontal, or at one or more non-horizontal angles, depending on which combination of openings of the lifting device 707 are coupled to the lifting machine, and on the weigh distribution on the base 703. The one or more non-horizontal angles may be set to coincide with a desired entry angle. For instance, an angled entry may be selected to avoid contact with the gas turbine engine 101 (FIG. 1), or for subsequent maneuvering and/or alignment after an initial landing.

Also for example, the plurality of lifting devices 707 may be symmetric with each other. In particular, the plurality of lifting devices 707 may include two openings on the inner end 704 and two openings on the outer end 705, all four located perpendicularly equidistant from the base 703 and perpendicularly equidistant from the centerline of the base 703. In addition, each opening may be located between one diameter and two diameters from opposite edges of the inner end 704 and the outer end 705, respectively. Here, a "diameter" may include the maximum dimension of the respective opening in the direction perpendicular from the centerline. Also, the location of an opening may be measured at its center, at an edge, and/or consistently at any convenient point within.

Alternately, the plurality of lifting devices 707 may be non-symmetric with another. In particular, at least one opening on the inner end 704 or on the outer end 705 may be located at a perpendicular distance from the base 703 and/or perpendicular distance from the centerline of the base 703 different from at least one other opening. To illustrate, a first opening on the inner end 704 and a first opening on the outer end 705 may be located perpendicularly equidistant from the base 703 and perpendicularly equidistant from the centerline of the base 703, whereas a second opening on the inner end 704 and a second opening on the outer end 705 may be located, relative to each other, perpendicularly equidistant from the base 703 and perpendicularly equidistant from the centerline of the base 703, but at a different perpendicular distance from the base 703 or perpendicular distance from the centerline of the base 703 than the first openings.

Moreover, the plurality of lifting devices 707 may include both embodiments combined (i.e., symmetric and non-symmetric). In particular, the frame unit 701 may include six or more openings located at both symmetric and asymmetric locations such that the frame unit 701 may be hoisted at symmetrical or asymmetrical attach points, depending on which combination of openings of the lifting device 707 are selected. Also, depending on the weigh distribution on the base 703, selection of asymmetric openings may provide for a balanced lift, an imbalanced lift, or a tilted lift. Likewise, depending on the weigh distribution on the base 703, selection of symmetric openings may provide for a balanced lift, an imbalanced lift, or a tilted lift.

According to one embodiment, the plurality of lifting devices 707 may be configured for universal installation. In particular, using the disclosed plurality of lifting devices 707, the fuel control module 700 may be installed in multiple installations and/or multiple configurations. Here, multiple installations may include multiple gas turbine engine packages 100. Similarly, multiple configurations may include variations in the positioning or orientation of the fuel control module 700 within a single gas turbine engine package 100, and/or variations in the positioning or orientation of the individual frame units 701 within the gas turbine engine package 100. For example, the frame unit 701 may include additional lifting devices 707 for the multiple installations and/or multiple configurations. To illustrate, the frame unit 701 may include lifting devices 707 configured for multiple entry angles associated with different gas turbine engine packages 100. Alternately, the frame unit 701 may include lifting devices 707 configured for both a left hand and a right hand entry. Alternately, the frame unit 701 may include lifting devices 707 configured for the fuel control module 700 to be installed forward facing or rearward facing (i.e., with the centerlines of the bases 703 rotated 180 degrees).

According to one embodiment the plurality of lifting devices 707 may be positioned relative to the vertical weight distribution of the frame unit 701 when the base 703 is resting on a horizontal surface. In particular, the plurality of lifting devices 707 may be positioned above the center of gravity of the frame unit 701. For example, the inner end 704 and the outer end 705 may sufficiently extend vertically beyond the center of gravity, and the lifting devices 707 may be located at the top of the inner end 704 and the outer end 705, respectively. According to one embodiment, each opening may be between one diameter and two diameters from the tops of the inner end 704 and the outer end 705, respectively. Here, a "diameter" may include the maximum dimension of the respective opening in the vertical direction.

The fuel inlet 711 is an interface to couple with a fuel conduit to receive fuel from a fuel supply. In particular, the fuel inlet 711 may be any conventional fitting mating with the fuel supply. For example, the fuel inlet 711 may include a ¾" 150 LB ANSI RF flange. Also for example, the fuel inlet 711 may include a metric flange, or any conventional coupling meeting the particular specifications of the facility where the gas turbine engine 101 (FIG. 1) is located, and of the fuel system of the gas turbine engine 101. The fuel conduit may include any conventional fuel plumbing and intervening structures.

According to one embodiment, the fuel inlet 711 may be recessed within frame unit 701, such that the segmented fuel path 710 may receive fuel from various supply interfaces. The various supply interfaces may be from the first side 716 or the second side 717. In particular, the fuel inlet 711 may be recessed inboard from the outer end 705 such that a bend, such as a ninety-degree coupling, may reside substantially within the frame unit 701 while turning. For example, the fuel inlet 711 may be recessed at least 7" (17.8 cm) inboard of the outer end 705. Also for example, the fuel inlet 711 may be recessed between 6" and 12" (15.2 cm-30.5 cm) inboard of the outer end 705. Also for example, the fuel inlet 711 may be recessed between inboard of the outer end 705. Also for example, the fuel inlet 711 may be recessed inboard of the outer end 705 at least the distance of diameter of the fuel inlet 711.

The fuel control module 700 may include a base plate (not shown), a structural member configured to support a plurality of frame units 701. In particular, the base plate may mount to a support platform 103 of the gas turbine engine package 100 and interface with the first and second frame units 701. The base plate may form a single base between the bases 703 of first and second frame units 701, uniting them as a single unit. The base plate may be made of plate steel, or any other structural material.

Each frame unit 701 is populated with its respective functional components, and is coupled to the other at the frame unit interface 791, together making the fuel control module 700. Each frame unit 701 supports a portion of the segmented fuel path 710 and a portion of the distributed fuel controller 750. Each frame unit 701 may further support a portion of the pressurized gas path 720, a terminal box 730, one or more transmitters 740, and other componentry.

The segmented fuel path 710 is a fuel flow path between a fuel supply and the fuel system of the gas turbine engine 101 (FIG. 1), and segmented across the frame unit interface 791. In particular, the segmented fuel path 710 includes a fuel inlet 711, a fuel outlet 714, and any suitable fluid conduit, piping, ducting, manifolds, etc. therebetween, including passageways though the various fluid components. The segmented fuel path 710, once assembled, is configured to deliver fuel received at from the fuel inlet 711 to the gas turbine engine 101 via the fuel outlet 714.

As illustrated in FIG. 3, the fuel outlet 714 is an interface configured to couple with a fuel conduit to deliver fuel to the fuel system of the gas turbine engine 101 (FIG. 1). In particular, the fuel outlet 714 is a fuel coupling that outputs pressurized and regulated fuel from the fuel control module 700. For example, the fuel outlet 714 may include a ½" 150 LB ANSI RF flange. Also for example, the fuel outlet 714 may include a metric flange, or any other coupling meeting the particular specifications of the fuel system. According to one embodiment, the fuel outlet 714 may include a plurality of outlet lines. For example the fuel outlet 714 may include multiple interfaces with the fuel system of the gas turbine engine 101, including an outlet lines plumbed to and associated with the each fuel control valve of the distributed fuel controller 750 (e.g., a main fuel control valve 753, a pilot fuel control valve 754, and a torch fuel control valve).

According to one embodiment, the segmented fuel path 710 may minimize the couplings between the first and the second frame units 701. In particular, the segmented fuel path 710 may cross the frame unit interface 791 a single time. For example, where the fuel outlet 714 includes multiple interfaces with the fuel system of the gas turbine engine 101, the segmented fuel path 710 may include a single fuel path at the frame unit interface 791, and a manifold (not shown) that divides the single path of the segmented fuel path 710 into a plurality of flows downstream of the frame unit interface 791. For example, here, the manifold divides the segmented fuel path 710 into two flows, one going to a main fuel control valve 753, and one going to a pilot fuel control valve 754.

According to one embodiment, the segmented fuel path 710 may be configured for universal installation. In particular, using the disclosed segmented fuel path 710, the fuel control module 700 may be configured to be installed with a plurality of gas turbine engine packages 100 (FIG. 1), in a plurality of positions on a gas turbine engine package 100, and/or having a plurality of external interfaces. For example, the fuel inlet 711 may be aligned with the centerline of the base 703, such that the segmented fuel path 710 may receive fuel equally from either side. Additionally one or more fuel outlets 714 may be aligned with the centerline of the base 703 such that the segmented fuel path 710 may deliver fuel equally from either the first side 716 or the second side 717.

The distributed fuel controller 750, which generally includes the assorted controllers and devices that interface with the segmented fuel path 710, controls and regulates fuel flow into the gas turbine engine 101 (FIG. 1). In particular, the distributed fuel controller 750 may be configured to provide fuel shutoff, pressure regulation, and/or flow regulation. The distributed fuel controller 750 includes a primary fuel shut-off valve 751, a main fuel control valve 753, and a pressure regulator. The primary fuel shut-off valve 751 may be located in an upstream portion of the segmented fuel path 710, and is configured to stop fuel flow within the segmented fuel path 710 when commanded. The main fuel control valve 753 is a metering flow valve that controls the main fuel powering the gas turbine engine 101. The pressure regulator may be integrated into the main fuel control valve 753, providing fuel to the gas turbine engine's main fuel system metered at both the required flow and pressure.

The distributed fuel controller 750 may further include a secondary fuel shut-off valve 752, a pilot fuel control valve 754, and a torch fuel control valve (not shown). The secondary fuel shut-off valve 752 is a redundant or "back up" shut-off valve, relative to the primary fuel shut-off valve 751, and is configured to stop fuel flow within the segmented fuel path 710 when commanded. The secondary fuel shut-off valve 752 may also be located in an upstream portion of the segmented fuel path 710. The pilot fuel control valve 754 and the torch fuel control valve may be configured to provide fuel metering control for independent fuel supplies to the gas turbine engine 101 (FIG. 1). For example, the pilot fuel system and the ignition torch may require independent flow rates, finer metering control, and/or independent interfaces with the fuel system of the gas turbine engine 101.

One or more fluid components of the distributed fuel controller 750 may be pneumatically activated or powered. In particular, at least one of the primary fuel shut-off valve 751, the secondary fuel shut-off valve 752, the main fuel control valve 753, the pilot fuel control valve 754, and the torch fuel control valve may be a pneumatic valve, actuated, powered, or assisted by pressurized gas. As such, the component actuated, powered, or assisted by pressurized gas may also include an interface to the pressurized gas path 720.

The pressurized gas path 720 is an "instrument gas" system within the fuel control module 700, segmented across the frame unit interface 791. "Instrument gas" is air or other gas that is pressurized and that may be cleaned and filtered. The instrument gas is typically supplied by the facility where the gas turbine engine package 100 is installed. The pressurized gas path 720 may include a pressurized gas inlet 721 with supply lines 724 including any suitable fluid conduit, piping, pressurized gas lines, manifolds, etc., therebetween.

According to one embodiment, the fuel control module 700 may also be configured independently to ensure pressurized gas quality and/or provide redundant protection. In particular, the pressurized gas path 720 may include its own filter 725, which is independent and in addition to any external filter 725 of the pressurized gas supply. The filter 725 may be embodied as an assembly and configured to clean gas received at the pressurized gas inlet 721 prior to being delivered to any supply line 724. For example, the filter 725 maybe located downstream but proximate the pressurized gas inlet 721. Additionally, the filter 725 may be mounted directly to the frame unit 701. For example, as illustrated, the filter 725 may be mounted to the outer end 705 and support the pressurized gas inlet 721.

Once coupled, the pressurized gas path 720 is configured to deliver instrument gas received at the pressurized gas inlet 721 to one or more fluid components of the distributed fuel controller 750 via the supply lines 724. The supply lines 724 may pneumatically couple with one or more components onboard the fuel control module 700. The pressurized gas path 720 may include a manifold or other conventional flow divider. The supply lines 724 may extend from the manifold or flow divider and pneumatically couple with at least one of the primary fuel shut-off valve 751, the secondary fuel shut-off valve 752, the main fuel control valve 753, a pilot fuel control valve 754, and a torch fuel control valve.

The fuel control module 700 also includes a gas vent manifold 800. The gas vent manifold 800 may be installed in one of the frame units 701. In the embodiment illustrated, the gas vent manifold 800 is installed at the base 703 of the frame unit 701 including the pressurized gas inlet 721 and the filter 725. The gas vent manifold 800 includes a condensation portion 810, a first gas vent portion 820 (FIG. 2), and a second gas vent portion 830 (FIG. 3).

Referring to FIG. 2, the first gas vent portion 820 is in fluid communication with the condensation portion 810. The first gas vent portion 820 includes a first gas vent connection 823. The first gas vent connection 823 is situated near or adjacent the first side 716. In the embodiment illustrated, the first gas vent connection 823 is located proximal to a side support 706.

The gas vent manifold 800 may include a first location bracket 821 and a first support bracket 822. The first location bracket 821 and the first support bracket 822 may extend from the first gas vent portion 820. The first location bracket 821 and the first support bracket 822 may include an 'L' shape. Other types and styles of brackets may also be used. In the embodiment illustrated, the first location bracket 821 extends horizontally out from and normal to first gas vent portion 820 and then vertically down towards the ground. The first location bracket 821 may include a first fastening hole (not shown). In the embodiment shown in FIG. 2, a first fastener 841 secures or fastens the first location bracket 821 to a side support 706.

The first support bracket 822 may extend vertically down from and normal to the first gas vent portion 820 and then horizontally out. The horizontal portion may form a base of the bracket. The first support bracket 822 may be configured to contact the ground or the base 703. The first location bracket 821 and the first support bracket 822 may be bonded to the first gas vent portion 820. In one embodiment, the first location bracket 821 and the first support bracket 822 are welded to the first gas vent portion 820.

Referring to FIG. 3, the second gas vent portion 830 is in fluid communication with the condensation portion 810. The second gas vent portion 830 includes a second gas vent connection 833. The second gas vent connection 833 is situated near or adjacent the second side 716. In the embodiment illustrated, the second gas vent connection 833 is located proximal to a side support 706.

The gas vent manifold 800 may include a second location bracket 831 and a second support bracket 832. The second location bracket 831 and the second support bracket 832 may extend from the second gas vent portion 830. The second location bracket 831 and the second support bracket 832 may include an 'L' shape. Other types and styles of brackets may also be used. In the embodiment illustrated, the second location bracket 831 extends horizontally out from and normal to second gas vent portion 830 and then vertically down towards the ground. The second location bracket may include a second fastening hole 839 (shown in FIG. 4). In the embodiment shown in FIG. 3, a second fastener 842 secures or fastens the second location bracket 831 to a side support 706.

The second support bracket 832 may extend vertically down from and normal to the second gas vent portion 830 and then horizontally out. The horizontal portion may form a base of the bracket. The second support bracket 832 may be configured to contact the ground or the base 703. The second location bracket 831 and the second support bracket 832 may be bonded to the second gas vent portion 830. In one embodiment, the second location bracket 831 and the second support bracket 832 are welded to the second gas vent portion 830.

Referring to FIGS. 2 and 3, gas vent connector 845 may be connected to the first gas vent connection 823 or the second gas vent connection 833. In some embodiments, a gas vent connector 845 is connected to the first gas vent connection 823 or a gas vent connector 845 is connected to the second gas vent connection 833. In other embodiments, a plug is inserted into or a cap is placed over either the first gas vent connection 823 or the second gas vent connection 833. The gas vent connector 845 may couple the gas vent manifold 800 to a vent system.

As illustrated in FIGS. 2 and 3, the condensation portion 810 may include a first condensation drain port 811 and a second condensation drain port 812. The first condensation drain port 811 and the second condensation drain port 812 are in fluid communication with the condensation portion 810. The first condensation drain port 811 and the second condensation drain port 812 may be welded to the condensation portion 810. The first condensation drain port 811 may be located closer to the first gas vent portion 820 than to the second gas vent portion 830. The second condensation drain port 812 may be located closer to the second gas vent portion 830 than to the first gas vent portion 820. The first condensation drain port 811 and the second condensation drain port 812 may each be either connected to a condensation drain (not shown), or may be plugged or capped. In the embodiment illustrated, a plug 815 is inserted into the first condensation drain port 811 and the second condensation drain port 812.

Gas vent manifold 800 also includes multiple connection ports. Each connection ports may be located on and in fluid communication with condensation portion 810, first gas vent portion 820, or second gas vent portion 830. Each connection port may also be welded to condensation portion 810, first gas vent portion 820, or second gas vent portion 830. Vent lines 846 may pneumatically couple with and extend from at least one of the primary fuel shut-off valve 751, the secondary fuel shut-off valve 752, the main fuel control valve 753, a pilot fuel control valve 754, and a torch fuel control valve. Vent lines 846 may then couple to gas vent manifold 800 at one of the connection ports.

The terminal box 730 is an enclosed junction where power enters the frame unit 701, and is routed to the various components onboard. The terminal box 730 may include an enclosure, a power bus inside its enclosure, and a standard power receptacle 731 accessible from outside its enclosure. Electrically-powered components of each frame unit 701 may be electrically coupled to the power bus. According to one embodiment, the terminal box 730 may also receive and route communications lines. According to one embodiment, the terminal box 730 may take an elongated shape, perpendicular to the centerline of the frame unit 701, wherein its power receptacle 731 is located at an end away from the centerline and accessible from the side of the frame unit 701.

According to another embodiment, each frame unit 701 may include its own terminal box 730. In particular, the electrically-powered components of each frame unit 701 may be electrically coupled to a local terminal box 730. For example, each local terminal box 730 may include its own power supply and be isolated from another frame unit 701, without frame-to-frame connections. Alternately, the first frame unit 701 may receive offboard power and then supply power to the second frame unit 701.

According to one embodiment the terminal box 730 may be configured for universal installation. In particular, each terminal box 730 may be configured as a local power supply for a single frame unit 701, and further configured to receive power from various supplies. For example, as above, all electrically-powered components of each frame unit 701 may be electrically powered by a local terminal box 730, and the terminal box 730 may include multiple power receptacles 731. According to one embodiment, the terminal box 730 may include power receptacles 731 on opposite ends of the terminal box 730 such that a power plug may be engaged from either of the frame unit 701. In addition, the same terminal box 730 may include an inboard power receptacle 731 configured to receive power from another terminal box 730. Where multiple frame unit 701 are used, a terminal box 730 may include two inboard power receptacles 731, one configured to receive and one configured to supply power in a daisy chain.

The transmitter 740 is a communication device that communicates feedback regarding the fuel control module 700. According to one embodiment, the transmitter 740 may receive commands from a remote controller such as in control panel 107 (FIG. 1). As illustrated, the fuel control module 700 may include multiple transmitters 740, relaying multiple measurements. According to one embodiment, the multiple transmitters 740 may include redundant or back-up transmitters 740 that provide duplicative information.

Each transmitter 740 may include a component interface and a data output. The component interface may include a communication link, a sensor, or any combination thereof. The component interface is configured to receive measurements such as pressure, flow rates, state/state changes, etc. Likewise, the data output may include a communication link, a data display, or any combination thereof. The data output is configured to relay the received measurements to a remote controller or display (e.g., control panel 107) and/or to display the received measurements in situ. According to one embodiment, the transmitter 740 may include a processor configured to convert the received measurements to a viewable or communicable format.

According to one embodiment, the transmitter 740 may be configured for universal installation as well. In particular, the transmitter 740 may be configured to be installed with a plurality of gas turbine engine packages 100 (FIG. 1), in a plurality of positions on a gas turbine engine package 100, and/or having a plurality of external interfaces. For example, where the transmitter 740 includes a viewable data display, it may be aligned with the centerline of the base 703, such that the transmitter 740 is equally readable from either side of the centerline. Alternately, the transmitter 740 may include duplicative data displays, such that the transmitter 740 may be viewed, independent of which gas turbine engine package 100 installation and/or configuration is used. Additionally, the transmitter 740 may include duplicative data outputs, such that the transmitter 740 may be equally accessed, independent of which gas turbine engine package 100 installation and/or configuration is used.

Figure 4:
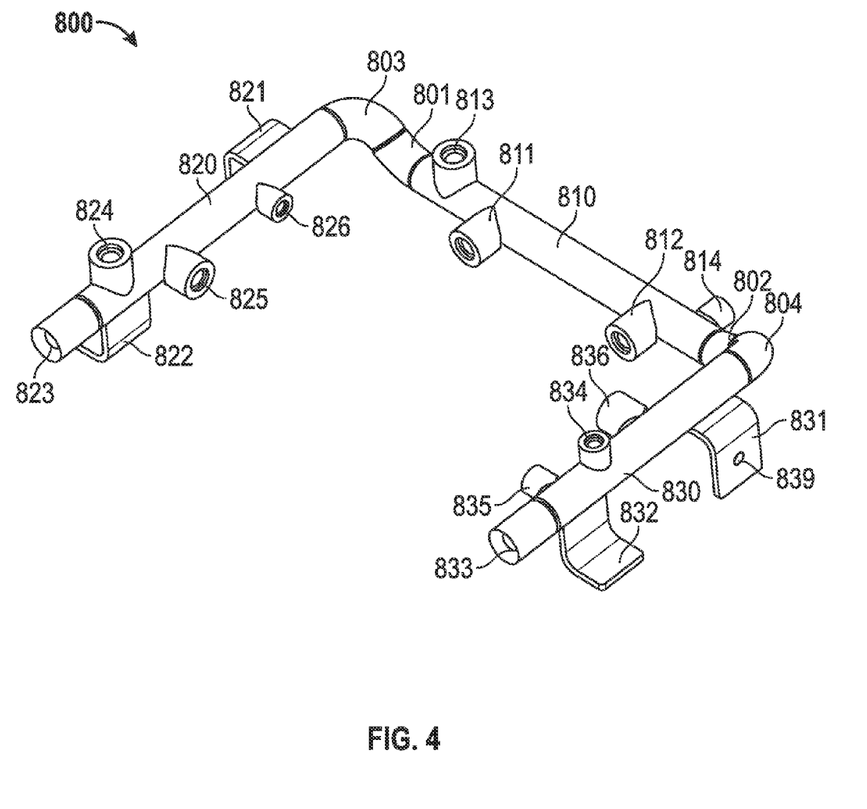
FIG. 4 is a perspective view of the gas vent manifold of FIGS. 2 and 3.

FIG. 4 is a perspective view of the gas vent manifold 800 of FIGS. 2 and 3. Condensation portion 810, first gas vent portion 820, and second gas vent portion 830 may be tubes. In one embodiment, condensation portion 810, first gas vent portion 820, and second gas vent portion 830 are twenty-five millimeter (one inch) nominal tubes. In the embodiment illustrated, the first gas vent portion 820 and the second gas vent portion 830 are parallel to each other and perpendicular to the condensation portion 810 forming a 'U' shape. Second gas vent portion 830 may connect to condensation portion 810 at a location distal to or at the end opposite first gas vent portion 820. Gas vent manifold 800 including condensation portion 810, first gas vent portion 820, and second gas vent portion 830 may be made from a metal, such as stainless steel.

Condensation portion 810 is configured to collect condensation during operation of the gas turbine engine 101. Condensation portion 810 may run horizontally. The first gas vent portion 820 and the second gas vent portion 830 may run or extend at a higher elevation than condensation portion 810 when gas vent manifold 800 is installed in fuel control module 700. In embodiments, at least a part of condensation portion 810 extends between first gas vent portion 820 and second gas vent portion 830 with the axis of condensation portion 810 on a plane that is different than the plane that includes the axis of first gas vent portion 820 and the axis of second gas vent portion 830.

As illustrated in FIGS. 2 and 3, condensation portion 810 may be configured to contact base 703. First condensation drain port 811 and second condensation drain port 812 may each extend horizontally from condensation portion 810. First condensation drain port 811 and second condensation drain port 812 may be a socket similar to the socket of a tee fitting or a reducer tee fitting.

Condensation portion 810 and first gas vent portion 820 may be coupled together with one or multiple fittings. Similarly, condensation portion 810 and second gas vent portion 830 may also be coupled together with one or multiple fittings. The couplings, including attaching the fittings to condensation portion 810, first gas vent portion 820, and second gas vent portion 830, may be welded. Other metal bonding methods may also be used. A first fitting 801 and a third fitting 803 may couple condensation portion 810 to first gas vent portion 820, and a second fitting 802 and a fourth fitting 804 may couple condensation portion 810 to second gas vent portion 830.

In the embodiment illustrated, the first fitting 801 and the second fitting 802 are forty-five degree elbows, while the third fitting 803 and the fourth fitting 804 are ninety degree elbows. In other embodiments, the first fitting 801 and the second fitting 802 are ninety degree elbows, while the third fitting 803 and the fourth fitting 804 are forty-five degree elbows. Other combinations of fittings may also be used.

The fittings may be configured to orient condensation portion 810 at a lower elevation or on a different plane than first gas vent portion 820 and second gas vent portion 830. In the embodiment illustrated the first gas vent portion 820 extends on a first plane from first gas vent connection 823. A first ninety degree elbow is connected to either the first gas vent portion 820 or the condensation portion 810. The first ninety degree elbow is rotated relative to the first plane about the axis of the pipe or portion it is connected to by forty-five degrees. A first forty-five degree elbow is then connected between the first ninety degree elbow and the other of the first gas vent portion 820 and the condensation portion 810. The condensation portion 810 extends from the first ninety and forty-five degree elbows in a second direction on a second plane parallel to the first plane. A second 90 degree elbow is connected to either the second gas vent portion 830 or the condensation portion 810 opposite the first ninety degree elbow. The second ninety degree elbow is also rotated relative to the first plane about the axis of the pipe or portion it is connected to by forty-five degrees. A second forty-five degree elbow is then connected between the second ninety degree elbow and the other of the second gas vent portion 830 and the condensation portion 810. The second gas vent portion 830 then extends from the second ninety and forty-five degree elbows on the first plane parallel to the first gas vent portion 820 to the second gas vent connection 833. In another embodiment, two ninety degree elbows are used between the first gas vent portion 820 and the condensation portion 810, and two ninety degree elbows are used between the second gas vent portion 830 and the condensation portion 810.

As previously mentioned, the gas vent manifold 800 includes multiple connection ports. Similar to first condensation drain port 811 and second condensation drain port 812, each connection port may be a socket similar to the socket of a tee fitting or a reducer tee fitting. In one embodiment, gas vent manifold 800 includes from six to ten connection ports. In the embodiment illustrated, gas vent manifold 800 includes eight connection ports. Each connection port may have a diameter that is smaller than the diameter of the condensation portion 810, the first gas vent portion 820, and the second gas vent portion 830.

As illustrated, condensation portion 810 includes connection ports 813 and 814; first gas vent portion 820 includes connection ports 824, 825, and 826; and second gas vent portion 830 includes connection ports 834, 835, and 836. Connection port 813 extends up vertically from condensation portion 810 adjacent first fitting 801 and connection port 814 extends horizontally from condensation portion 810 adjacent second fitting 802. Connection port 824 extends vertically from first gas vent portion 820 adjacent first gas vent connection 823, connection port 826 extends horizontally from first gas vent portion 820, and connection port 825 extends horizontally from first gas vent portion 820 between connection ports 824 and 826. Connection port 835 extends horizontally from second gas vent portion 830 adjacent second gas vent connection 833, connection port 836 extends horizontally from second gas vent portion 830, and connection port 834 extends vertically from second gas vent portion 830 between connection ports 835 and 836. Other configurations and locations of connection ports may also be used.

INDUSTRIAL APPLICABILITY

The present disclosure generally applies to a fuel control module for a gas turbine engine. The described embodiments are not limited to use in conjunction with a particular type of gas turbine engine or any type of fuel. Gas turbine engines, and thus their components and support systems, may be suited for any number of industrial applications, such as, but not limited to, various aspects of the oil and natural gas industry (including include transmission, gathering, storage, withdrawal, and lifting of oil and natural gas), power generation industry, aerospace and transportation industry, to name a few examples.

Generally, embodiments of the presently disclosed fuel control module 700 with a gas vent manifold 800 are applicable to the use, operation, maintenance, repair, and improvement of gas turbine engines, and may be used in order to improve performance and efficiency, decrease maintenance and repair, and/or lower costs. In addition, embodiments of the presently disclosed fuel control module 700 with a gas vent manifold 800 may be applicable at any stage of the gas turbine engine's life, from design to prototyping and first manufacture, and onward to end of life. Accordingly, the fuel control module 700 may be used in conjunction with a retrofit or enhancement to existing gas turbine engine, as a preventative measure, or even in response to an event.

In particular, the presently disclosed gas vent manifold 800 may provide for universal installation. The inclusion of features for universal installation, such as the first gas vent connection 823 and the second gas vent connection 833, and the first condensation drain port 811 and the second condensation drain port 812, may provide the additional benefits associated with having a single design and multiple options for use in multiple installations and/or multiple configurations, which may have been customized to a unique gas turbine engine package or facility interfaces. The gas vent connections and the condensation drain ports on each side of the fuel control module 700 may simplify a customer's connection to the gas turbine engine package 100. A customer may conveniently connect to either side of the fuel control module 700 to the first gas vent connection 823 or to the second gas vent connection 833 to vent the used gas. The customer may also conveniently connect to either side of the fuel control module 700 to drain the condensation collected in the condensation portion 810. The unused gas vent connection and condensation drain port may be plugged or capped.

The use of tubing with multiple tube fittings to vent pressurized instrument gas may create venting back pressure and may increase the number of potential leak points. The use of the disclosed gas vent manifold 800 may reduce the back pressure and the potential leak points due to the increased diameter of the gas vent manifold 800 compared to the diameter of the tubing and by reducing the number of tube fittings.

The first location bracket 821 and the second location bracket 831 may locate the gas vent manifold 800 within the fuel control module 700, may be used to secure the gas vent manifold 800 to the fuel control module 700, and may set the height of the gas vent manifold 800, in particular the height of the first gas vent portion 820 and the second gas vent portion 830 above the condensation portion 810.

As first gas vent portion 820 and second gas vent portion 830 may be elevated from the ground or from base 703, the first support bracket 822 and the second support bracket 832 may support the weight of the gas vent manifold 800 and may support the first gas vent portion 820 or the second gas vent portion 830 when outside forces are applied to the first gas vent portion 820 or the second gas vent portion 830.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a stationary gas turbine engine, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A fuel control module for a gas turbine engine, the fuel control module comprising:
   a first side;
   a second side;
   a first outer end extending from the first side to the second side;
   a second outer end extending from the first side to the second side, opposite the first outer end;
   a fuel path including a fuel inlet configured to receive fuel from a fuel supply, and a fuel outlet configured to deliver fuel to the gas turbine engine;
   a plurality of pneumatic valves; and
   a gas vent manifold including
      a first gas vent portion including a first gas vent connection adjacent the first side,
      a second gas vent portion in parallel to the first gas vent portion, distal to the first gas vent portion and in fluid communication with the first gas vent portion, the second gas vent portion including a second gas vent connection adjacent the second side,
      a condensation portion extending between the first gas vent portion and the second gas vent portion, the axis of the condensation portion extending on a different plane at a lower elevation than a plane including the axis of the first gas vent portion and the axis of the second gas vent portion, the condensation portion connecting to the first gas vent portion distal to the first gas vent connection and connecting to the second gas vent portion distal to the second gas vent connection,
      a condensation drain port in fluid communication with the condensation portion, and
      a plurality of connection ports, each connection port being in fluid communication with one of the first gas vent portion, the second gas vent portion, and the condensation portion and to a vent line of at least one of the plurality of pneumatic valves.

2. The fuel control module of claim 1, wherein the gas vent manifold further comprises:
   a first location bracket extending from the first gas vent portion, the first location bracket being fastened to a first side support at the first side; and
   a second location bracket extending from the second gas vent portion, the second location bracket being fastened to a second side support at the second side.

3. The fuel control module of claim 1, wherein the gas vent manifold further comprises:
   a first support bracket bonded to the first gas vent portion, the first support bracket configured to support the first gas vent portion; and
   a second support bracket bonded to the second gas vent portion, the second support bracket configured to support the first gas vent portion.

4. The fuel control module of claim 1, wherein the condensation portion, the first gas vent portion, and the second gas vent portion are one inch diameter metal tubes.

5. The fuel control module of claim 1, wherein the plurality of connection ports each include a diameter smaller than the diameter of the condensation portion, the first gas vent portion, and the second gas vent portion.

6. The fuel control module of claim 1, wherein one of the first gas vent connection and the second gas vent connection is connected to a vent system and the other is plugged.

7. The fuel control module of claim 1, wherein the first location bracket includes a first fastening hole to secure the gas vent manifold to the first side of the fuel control module and the second location bracket includes a second fastening hole to secure the gas vent manifold to the second side of the fuel control module.

8. A gas turbine engine package comprising:
   a gas turbine engine;
   a support platform; and
   the fuel control module of claim 1, the fuel control module being in fluid communication with the gas turbine engine, and mounted to the support platform.

9. A fuel control module for a gas turbine engine, the fuel control module comprising:
   a first side;
   a second side;
   a first outer end extending from the first side to the second side;
   a second outer end extending from the first side to the second side, opposite the first outer end;
   a fuel path including a fuel inlet configured to receive fuel from a fuel supply, and a fuel outlet configured to deliver fuel to the gas turbine engine;
   a plurality of pneumatic valves; and
   a gas vent manifold including
      a first gas vent portion extending on a first plane adjacent the first side, the first gas vent portion including a first gas vent connection,
      a second gas vent portion extending on the first plane parallel to the first gas vent portion adjacent the second side, the second gas vent portion including a second gas vent connection,
      a condensation portion extending between the first side and the second side on a second plane at a lower elevation than the first plane, the second plane being parallel to the first plane, the condensation portion connects to the first gas vent portion distal to the first gas vent connection and connects to the second gas vent portion distal to the second gas vent connection,
      a first condensation drain port welded to the condensation portion closer to the first gas vent portion than the second gas vent portion,
      a second condensation drain port welded to the condensation portion closer to the second gas vent portion than the first gas vent portion, and
      a plurality of connection ports, each connection port being welded to one of the first gas vent portion, the second gas vent portion, and the condensation portion and to at least one of the plurality of pneumatic valves.

10. The fuel control module of claim 9, wherein the first gas vent portion connects to the condensation portion by a first ninety degree elbow and a first forty-five degree elbow, and the second gas vent portion connects to the condensation portion by a second ninety degree elbow and a second forty-five degree elbow.

11. The fuel control module of claim 9, wherein the gas vent manifold further comprises:
   a first support bracket welded to the first gas vent portion and extending down from the first gas vent portion proximate the first gas vent connection;
   a second support bracket welded to the second gas vent portion and extending down from the second gas vent portion proximate the second gas vent connection;
   a first location bracket welded to the first gas vent portion and extending from the first gas vent portion in a direction opposite the second gas vent portion, the first location bracket configured to locate the first gas vent connection adjacent a first side of the fuel control module; and
   a second location bracket welded to the second gas vent portion and extending from the second gas vent portion in a direction opposite the first gas vent portion, the second location bracket configured to locate the second gas vent connection adjacent a second side of the fuel control module.

12. The fuel control module of claim 11, wherein the first location bracket includes a first fastening hole to secure the gas vent manifold to the first side of the fuel control module and the second location bracket includes a second fastening hole to secure the gas vent manifold to the second side of the fuel control module.

13. The fuel control module of claim 9, wherein one of the first gas vent connection and the second gas vent connection is connected to a vent system and the other is plugged, and wherein one of the first condensation drain port and the second condensation drain port is connected to a condensation drain and the other is plugged.

14. The fuel control module of claim 9, wherein the condensation portion, the first gas vent portion, and the second gas vent portion are one inch diameter stainless steel tubes and the plurality of connection ports each include a diameter smaller than one inch.

15. A split fuel control module for a gas turbine engine, the split fuel control module comprising:
   a first side;
   a second side;
   a first frame unit, the first frame unit including a first base, a first outer end extending from the first side to the second side, and a first inner end extending from the first side to the second side opposite the first outer end, the first inner end joined to and extending perpendicularly from the first base;
   a second frame unit, the second frame unit including a second base, a second outer end extending from the first side to the second side, and a second inner end extending from the first side to the second side opposite the second outer end, the second inner end joined to and extending perpendicularly from the second base, the second inner end configured to align and couple with the first inner end;
   a segmented fuel path, the segmented fuel path including a fuel inlet configured to receive fuel from a fuel supply, and a fuel outlet configured to deliver fuel to the gas turbine engine;
   a gas vent manifold including
   a condensation portion extending on a first plane between the first side and the second side adjacent the first base,
   a first gas vent portion coupled to the condensation portion on a second plane at a higher elevation than the first plane, the first gas vent portion including a first gas vent connection distal to the condensation portion, the first gas vent connection being adjacent to the first side,
   a second gas vent portion coupled to the condensation portion on the second plane distal to the first gas vent portion, the second gas vent portion being parallel to the first gas vent portion and including a second gas vent connection distal to the condensation portion, the second gas vent connection being adjacent to the second side,
   a first condensation drain port connected to the condensation portion closer to the first side than the second side,
   a second condensation drain port connected to the condensation portion closer to the second side than the first side, and
   a plurality of connection ports, each connection port being coupled to one of the first gas vent portion, the second gas vent portion, and the condensation portion; and
   a plurality of vent lines, each vent line coupled to one of the plurality of connection ports.

16. The split fuel control module of claim 15, wherein the gas vent manifold further comprises:
   a first support bracket welded to the first gas vent portion and extending down from the first gas vent portion toward the first base and proximate the first gas vent connection;
   a second support bracket welded to the second gas vent portion and extending down from the second gas vent portion toward the first base and proximate the second gas vent connection;
   a first location bracket welded to the first gas vent portion and extending from the first gas vent portion, the first location bracket being fastened to a first side support connected to the first base at the first side; and
   a second location bracket welded to the second gas vent portion and extending from the second gas vent portion, the second location bracket being fastened to a second side support connected to the first base at the second side.

17. The split fuel control module of claim 15, wherein the first gas vent portion is coupled to the condensation portion by a first ninety degree elbow and a first forty-five degree elbow, and the second gas vent portion is coupled to the condensation portion by a second ninety degree elbow and a second forty-five degree elbow, wherein the coupling between the first gas vent portion and the condensation portion includes is welded and the coupling between the second gas vent portion and the condensation portion is welded.

18. The split fuel control module of claim 15, wherein one of the first gas vent connection and the second gas vent connection is connected to a vent system and the other is plugged.

19. The split fuel control module of claim 15, wherein one of the first condensation drain port and the second condensation drain port is connected to a condensation drain and the other is plugged.

20. A gas turbine engine package comprising:
   a gas turbine engine;
   a support platform; and
   the split fuel control module of claim 15, the split fuel control module fluidly coupled to the gas turbine engine, and mounted to the support platform.

* * * * *